(12) United States Patent
Yavuzcetin

(10) Patent No.: US 10,796,603 B2
(45) Date of Patent: Oct. 6, 2020

(54) APPARATUS FOR DEMONSTRATING MECHANICAL IMPEDANCE

(71) Applicant: WiSys Technology Foundation, Inc., Madison, WI (US)

(72) Inventor: Ozgur Yavuzcetin, Fort Atkinson, WI (US)

(73) Assignee: WiSys Technology Foundation, Inc., Madison, WI (US)

( * ) Notice: Subject to any disclaimer, the term of this patent is extended or adjusted under 35 U.S.C. 154(b) by 325 days.

(21) Appl. No.: 15/981,304

(22) Filed: May 16, 2018

(65) Prior Publication Data

US 2018/0336802 A1     Nov. 22, 2018

Related U.S. Application Data

(60) Provisional application No. 62/506,675, filed on May 16, 2017.

(51) Int. Cl.
*G09B 23/10*     (2006.01)
(52) U.S. Cl.
CPC ..................... *G09B 23/10* (2013.01)
(58) Field of Classification Search
USPC ......... 434/276, 300, 302; 446/266; D21/466
See application file for complete search history.

(56) References Cited

U.S. PATENT DOCUMENTS

| 1,481,075 | A | * | 1/1924 | Strouse | G09B 23/10 434/300 |
|---|---|---|---|---|---|
| D219,515 | S | * | 12/1970 | Levitt | D19/62 |
| 3,594,925 | A | * | 7/1971 | Abbat | A63H 33/00 434/302 |
| 3,693,286 | A | * | 9/1972 | Marcotti | A63F 7/382 446/266 |
| D309,475 | S | * | 7/1990 | Salehzadeh | D21/466 |
| 5,158,462 | A | * | 10/1992 | Hones | G09B 23/08 434/300 |
| 5,503,587 | A | * | 4/1996 | Mellen | G09B 23/10 248/318 |
| D684,628 | S | * | 6/2013 | Hiller | D19/62 |
| 9,501,952 | B2 | * | 11/2016 | Mitchell, Jr. | G09B 23/10 |

OTHER PUBLICATIONS

"Collisions of suspended billiard balls", Jan. 2015 [retrieved online May 27, 2020]. (Year: 2015).*
Donald Simanek, "Newton's Cradle", Nov. 2014 [retrieved online May 27, 2020]. (Year: 2014).*
"Newton's Cradle; a Demonstration of Quantum-Geometry Dynamics", Aug. 17, 2013 [retrieved online May 27, 2020]. (Year: 2013).*
Nuno Alexandre De Sá Teixeira et al, "An information integration study on the intuitive physics of the Newton's cradle", Jan. 2014 [retrieved online May 27, 2020]. (Year: 2014).*

* cited by examiner

*Primary Examiner* — Kurt Fernstrom
(74) *Attorney, Agent, or Firm* — Boyle Fredrickson S.C.

(57) ABSTRACT

A device for demonstrating the interaction of conservation of energy and conservation of momentum provides a set of balls each supported as a pendulum and in stationary contact, the balls having different weights to illustrate the concept of mechanical impedance.

19 Claims, 2 Drawing Sheets

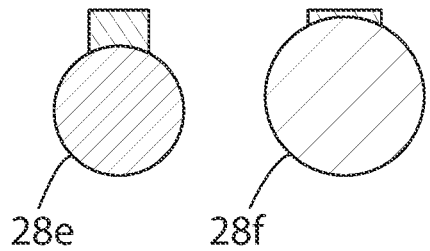
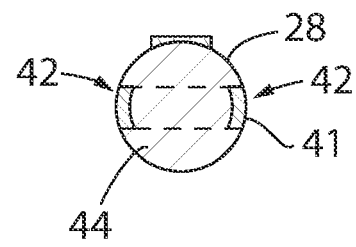
Fig. 4   Fig. 5
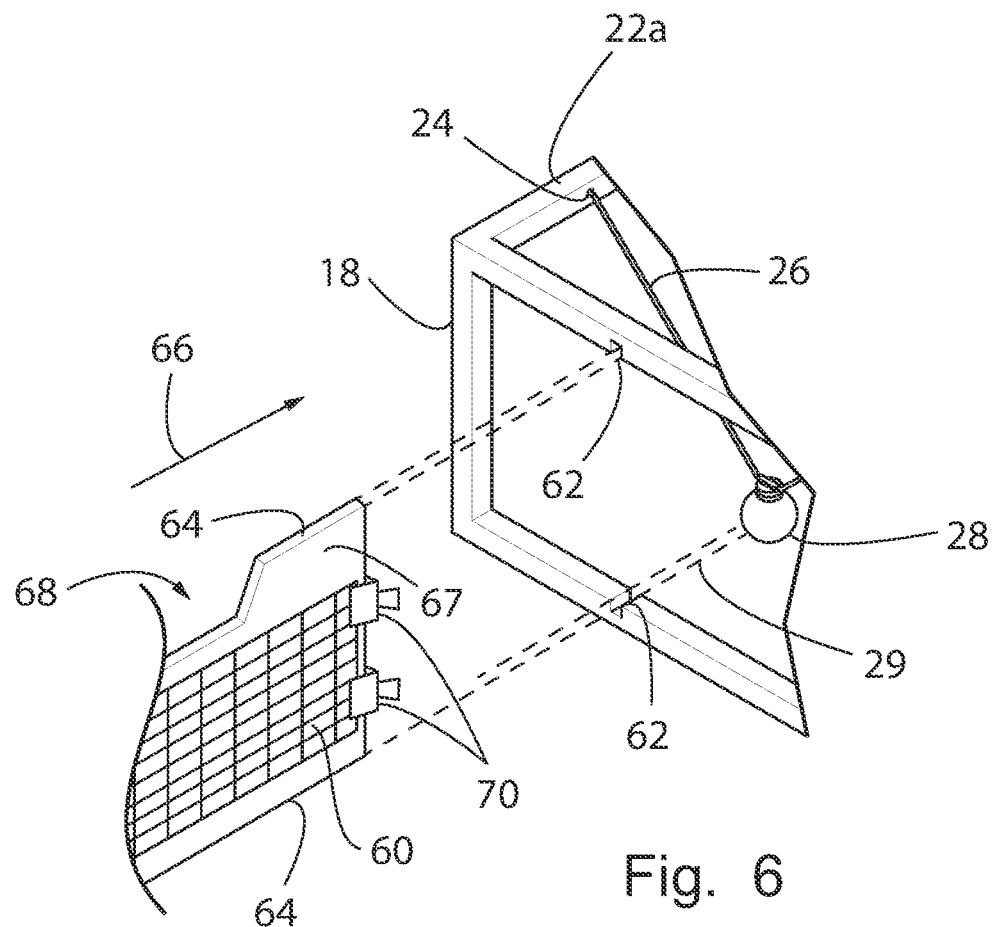
Fig. 6

APPARATUS FOR DEMONSTRATING MECHANICAL IMPEDANCE

CROSS REFERENCE TO RELATED APPLICATION

This application claims the benefit of U.S. provisional application 62/506,675 filed May 16, 2017, and hereby incorporated by reference.

BACKGROUND OF THE INVENTION

The present invention provides a teaching apparatus and in particular an apparatus useful for demonstrating the application of the principle of conservation of momentum.

The "conservation of energy" is a fundamental principle of Newtonian mechanics taught in the study of physics. Conservation of energy in a mechanical system may be demonstrated using a device known as a "Newton's cradle" which typically comprises a set of adjacent metal balls suspended as pendulum weights from a framework. The balls are arranged in a line so that when one end ball is drawn away from the line then released to swing downward against the line of balls, the energy of this ball is transferred through a set of intermediary elastic collisions through the line of balls to the ball on the opposite end. This latter ball swings upward as if to continue the arc of the pendulum of the first ball to approximately the same height as the first ball when it was released showing conservation of energy.

When two balls are drawn back together and then released to swing downward against the line of balls, two balls on the opposite end of the line of balls swing upward by an equal amount again showing a conservation of energy from the first two balls to the last two balls. In this case the energy can be characterized either as potential energy proportional to the height that the ball is raised (mh where m is mass and h is height) or the velocity of the ball at the moment of impact to a second ball characterized by the kinetic energy of the ball at the time of collision ($\frac{1}{2}mv^2$ where v is velocity).

SUMMARY OF THE INVENTION

Conservation of energy does not fully define elastic collisions or the motions of the balls in Newton's cradle. In the above example of releasing two balls, conservation of energy would be satisfied if a single ball (not two balls) swung upward from the opposite end of the line of balls and reached a height twice as high as the release height of the two balls. Similarly, conservation of energy would be satisfied if the first single ball that was released simply rebounded without any transfer of energy to a second ball.

A second principle of "conservation of momentum" is required, together with the conservation of energy, to describe the energy transfer. Generally, this principle of conservation of momentum requires that the momentum of the two objects before collision equals the momentum of the two objects after collision. The momentum of each ball close to the time of collision is equal to (mv). More generally, the concept of conservation of momentum underlies the important idea of mechanical impedance, which describes how much energy is transferred between colliding objects. This principle is important in understanding elastic collisions but also relates to the idea of impedance and impedance matching which are important in other fields of physics including electrical energy and optical energy transfer. Mechanical impedance, for example, explains the ideal weight of the baseball bat or golf club for transferring energy to a ball.

The present invention provides a modified Newton's cradle that better explores the principle of conservation of momentum not readily apparent when using a conventional Newton's cradle where each of the balls has identical weight and energy transfer is a highly simplified 100 percent. In this regard, the present invention provides a Newton's cradle having easily replaceable balls that can have different properties (for example: weight) to explore conservation of momentum. Other properties of the balls can also be varied including material, elasticity, and size to help isolate the quality of momentum. More fundamentally, the invention illustrates the idea of mechanical impedance and the relationship between impedance matching and energy transfer.

The present invention also demonstrates how material to material interaction could change the elasticity of the collision. In the classical Newton's Cradle, all the balls are made out of stainless steel, which has a high elasticity thereby increased energy transfer rate. By replacing the balls with softer materials, the elasticity of the collisions can be varied. The concept of elasticity and the energy transfer can be demonstrated.

The energy transfer or elasticity concept can be demonstrated either by replacing the balls with the same mass but different materials (inner cores could be filled by denser materials to compensate) or by changing both the material of the balls and the masses.

Specifically, then, one embodiment of the present invention provides an apparatus for demonstrating conservation of momentum and having a support structure providing an elevated support for a first and second set of fixation points longitudinally spaced along separate horizontal, parallel rails, the parallel rails separated along a transverse axis. A set of strings each has opposite ends attached to different ones of corresponding first and second sets of fixation points in transverse opposition and each have lengths greater than a spacing of the parallel rows to hang therebelow. A set of balls having one of at least two different weights are attached to the string by a set of connectors releasably attaching each of the balls to midpoints of corresponding different ones of the strings so that the balls hang adjacent to each other at equal height along a longitudinal row.

It is thus a feature of at least one embodiment of the invention to provide balls of different weights so as to produce energy transfer between the balls of less than 100 percent to demonstrate mechanical impedance matching.

The connectors may release with manual pressure on the ball downward away from the string.

It is thus a feature of at least one embodiment of the invention to provide an apparatus allowing rapid replacement of balls without tools or special equipment.

The connectors may include a magnet releasably attaching each given ball and string by magnetic attraction.

It is thus a feature of at least one embodiment of the invention to provide a simple and robust auto-aligning connector with low engagement force and good torsional resistance.

The connector may comprise a magnet and a ferromagnetic portion, one attached to the string and one attached to the ball.

It is thus a nature of at least one embodiment of the invention to reduce the cost of the connector to permit the use of low mass, high force rare earth magnets.

The magnet may be supported by the string.

It is thus a feature of at least one embodiment of the invention to limit the magnets to the number of necessary strings and distribute the inexpensive connector portion among the larger number of balls for lower-cost.

Each string may provide two separated fixation points to each connector, the fixation points spaced apart in the transverse direction to reduce twisting of the balls.

It is thus a feature of at least one embodiment of the invention to provide a connection system that reduces rotational oscillation of the balls such as may obscure energy transfer.

The two fixation points may be defined by exit points of the string passing through a transverse bore through which the string may slide.

It is thus a feature of at least one embodiment of the invention to provide a simple method of aligning the balls transversely.

The balls may have weights that differ by at least 10 percent.

It is thus a feature of at least one embodiment of the invention to provide noticeable changes in energy transfer.

In one embodiment the balls may be of equal size.

It is thus a feature of at least one embodiment of the invention to permit a simple presentation of impedance matching as a function of weight without the distraction of different balls sizes.

The balls may be made of materials selected from at least two or at least four different materials from the group consisting of steel, aluminum, brass, and polymer.

It is thus a feature of at least one embodiment of the invention provide a simple method of changing ball weights while preserving identical sizes using these common materials.

In one embodiment, the balls may include at least two balls having an identical weight and different size.

It is thus a feature of at least one embodiment of the invention to emphasize the weight dimension that affects energy transfer abstracted from sizes.

The balls may provide identical materials at points of contact with other balls but different weights.

It is thus a feature of at least one embodiment of the invention to eliminate the variability of energy transfer caused by the differences in resilience (or inelasticity) of material.

Alternatively, or in addition, the balls may have the same weight but be constructed of different materials, or the balls may include at least two sets of multiple balls of identical weights, the weights of the balls between the at least two sets being different.

It is thus a feature of at least one embodiment of the invention to abstract the energy transfer from the type of material and to emphasize the weight dimension as a relative difference in weight that affects momentum not absolute weight.

These particular objects and advantages may apply to only some embodiments falling within the claims and thus do not define the scope of the invention.

BRIEF DESCRIPTION OF THE DRAWINGS

FIG. 4 is a cross-sectional view through two different balls having identical weights but different sizes;

FIG. 5 is a cross-sectional view through a ball providing a shell allowing standard contacting materials to be used with a different body material; and FIG. 6 is a perspective fragmentary view showing an optional graph paper support for marking pendulum swing ranges.

DETAILED DESCRIPTION OF THE PREFERRED EMBODIMENT

Figure 1:
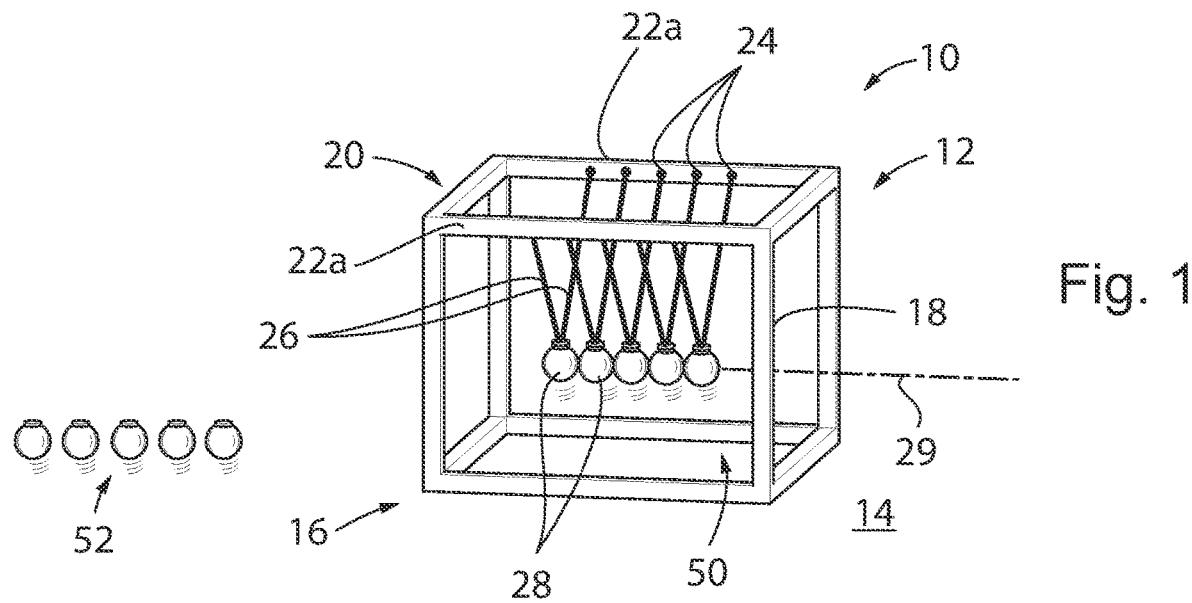
FIG. 1 is a perspective view of one embodiment of the invention providing a Newton's cradle having a support structure providing a row of statically contacting balls each supported as pendulums from the support structure.

Referring now to FIG. 1, a mechanical impedance demonstration device 10 according to at least one embodiment of the present invention may provide a Newton's cradle configuration having a framework 12 supportable on a horizontal surface such as a desktop or table 14 by means of a rectangular frame 16 adapted to lie horizontally against the surface of the table. Risers 18 extend upward from each corner of the frame 16 to join to corners of a second frame 20 parallel to and identically sized with respect to base frame 16 elevated with respect to the base frame 16. In one example, the framework 12 may have a height of approximately 10 inches, a longitudinal dimension of approximately 10 inches, and a transverse depth of approximately 6 inches, although a wide variety of dimensions and sizes are contemplated.

The second frame 20 may include two longitudinally extending parallel rails 22a and 22b separated along the transverse axis. Each of the rails 22 may hold multiple fixation points 24 in transverse opposition. As illustrated, in one embodiment each rail may support five equally spaced fixation points 24 located on opposed inner surfaces of the rails 22. It will be appreciated that the framework 12 need not be rectangular but a variety of different structures may be used if they provide the necessary strings supports.

Each string 26 may extend between two fixation points 24 and may have a length greater than the transverse separation of fixation points 24 so that the string 26 may hang down below the fixation points 24 and the rails 22 to each attach to a corresponding ball 28, the latter suspended by the string 26 in pendulum fashion. The length of the strings 26 is such that the balls 28 are suspended above the table for free movement. The framework 12 is sized and has a weight such that the balls 28 may freely swing on the strings 26 without movement of the frame on the table 14 and without interference from the structure of the framework 12.

The spacing of the fixation points 24 and the size of the balls 28 is such that the balls 28 are closely adjacent (preferably touching) at opposite tangent points on each ball 28 when the balls 28 rest statically in a single longitudinal line. The row of balls 28 is substantially centered along the transverse axis 29 so that the balls may swing between risers 18. The balls may have, for example, a diameter of approximately ¾ of an inch.

Figure 2:
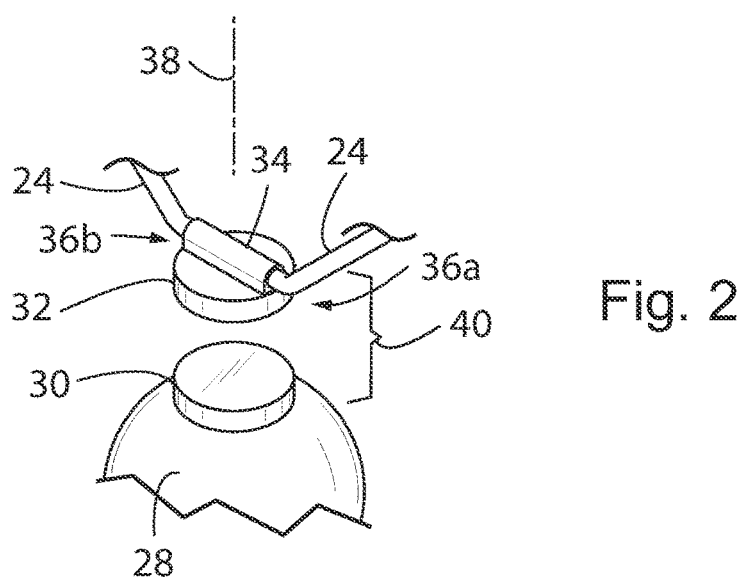
FIG. 2 is a detailed fragmentary view of one ball of FIG. 1 showing a magnetic connector releasably attaching the ball to pendulum strings and providing torsional resistance.

Referring now to FIG. 2, each ball 28 may have a ferromagnetic crown 30 being a small disk of ferromagnetic material such as iron or steel adhered to an apex of the ball 28, for example, with epoxy, or mechanically affixed by press fit, machine screws, or the like. This ferromagnetic crown 30 may be attracted to and releasably attached to a corresponding rare earth magnet 32 held at the midpoint of each string 26. The ferromagnetic crown 30 and magnet 32 together form a releasable connector 40 therebetween that can be assembled by simple upward placement of the crown 30 against the magnet 32 or separated by simple downward pressure by a user's hand on the ball 28 or by sliding the ferromagnetic crown 30 and magnet 32 across their plane of interface.

An upper surface of the magnet 32 may hold a transversely extending tube 34 through which string 26 associated with a given ball 28 may be threaded for simple assembly and alignment. The tube 34 may have a transverse length, for example, greater than 1/16 of an inch and ideally greater than 1/8 of an inch or more than one quarter of an inch so as to provide two separate fixation points 36a and 36b that are transversely spaced to reduce twisting of the ball 28 about a vertical axis 38, Such twisting provides a conduit diverting energy away from the pendulum motion such as can interfere with the demonstration.

In this regard, generally, a connector 40 formed from ferromagnetic crown 30 and magnet 32 resists torsional slippage of the type that would be expected in this situation.

The string 26 may be fixed within the tube 34, for example, after sliding the string 26 in the tube 34 to adjust the balls 28 into alignment with each other along a single longitudinal line. This fixation may be by glue or the like. Alternatively, the string 26 may be left unadhered for readjustment as needed.

It will be appreciated that different types of connectors 40 may be used including, for example, snap type connectors, hook and loop type connectors and the like providing that they offer simple mechanical release and attachment as will be understood from the following discussion. It will be appreciated further that the crown 30 may be a second magnet or the like.

Figure 3:
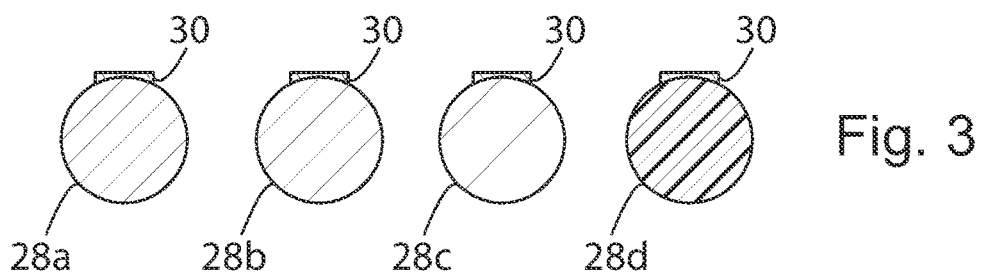
FIG. 3 is a cross-sectional view through different balls having different densities and hence different weights for identical sizes.

Referring now to FIG. 3, different of the balls 28 may be constructed of different materials to give them different weights such as affect energy transfer in the collision between balls 28. For example, ball 28a may be a steel or stainless-steel material, ball 28b may be a brass material, ball 28c may be an aluminum material and ball 28d may be a polymer material. Such materials have relative approximate densities of 7.81 grams per cubic centimeter, 8.7 grains per cubic centimeter, 2.7 grams per cubic centimeter, and 1.4 grams per cubic centimeter, respectively, meaning that equal sized (equal volume) balls 28 will have weights that differ by more than 10 percent among these different materials and in certain cases more than 50 percent. In this embodiment all of the balls 28 are of equal size so as to emphasize that it is the weight rather than the size of the balls 28 that affects energy transfer.

The invention, as shown in FIG. 1, may originally use all identical balls 28, for example, identically sized steel balls to show the general properties of the Newton's cradle and conservation of energy. In this situation 100 percent energy transfer occurs between balls 28 in the collision of any two balls 28. Removing one or more of the steel balls 28 and replacing them with balls of different weight will show different amounts of energy transfer with, for example, a less than 100 percent energy transfer where the striking ball 28 continues to move forward after the collision (when the striking ball is heavier than the struck ball on) or rebounds retaining rebounding energy (when the striking ball is lighter than the struck ball).

Referring now to FIG. 4, in one embodiment different balls 28e and 28f having an identical weight but different sizes are also contemplated to show that this transfer principle is not a function of the ball sizes but rather strictly a function of weight which controls momentum.

Referring now to FIG. 5, in order to provide comparable elastic collision, each ball 28 may be provided with a shell of identical or similarly elastic material (for example, steel) here implemented as a steel ring 41 encircling the ball 28 to provide contact regions 42 with adjacent balls 28 (not shown) having identical structure while allowing the remaining body 44 of the ball 28 be constructed of a variety of different materials to provide variation in weights.

Generally, different densities of materials of the balls 28 are not required but rather balls 28 may be constructed of inhomogeneous materials, for example, by providing weights in the center of lighter materials, hollow balls, or the like. In addition, the effects of inelastic collisions may be investigated by providing balls having different contacting surfaces, for example, materials of different elasticities such as elastomeric materials, or by using balls 28 that are hollow and filled with shifting materials such as sand or shot to absorb energy and dissipate that energy in friction.

Referring again to FIG. 1, generally, a first set of balls 50 may be attached to the strings 26 at any given time with a second set of balls 52 selectively replacing one or more of the first set of balls 50 for later demonstrations. The second set of balls 52 may have different properties than the first set of balls 50 and may have different properties within the set 52 as well. These properties include not only weights but also elasticities as discussed above.

In one embodiment, a sufficient number of balls 28 are provided so that the framework 12 can be populated alternatively with two different sets of identical balls, where the different sets are made from two different materials and/or have uniform different weights to show that impedance matching is a function of conservation of momentum and not simply a function of being an identical material or particular weight. Thus, in one example, the ball sets 50 and 52 may include different materials that nevertheless have the same weight to show that different materials can transfer energy completely depending on their weight not on their composition.

Referring now to FIG. 6, during demonstrations, it may be desirable to provide a way to record the swing ranges (for example, heights to which the individual balls 28 rise and their midpoints), for example, by marking on a sheet of graph paper 60 suspended behind the balls 28. For this purpose, opposed notches 62 may be placed in the horizontally extending side members of the lower frame 16 an upper frame 20 to receive upper and lower edges 64 of a thin panel 67 (for example, 1/8-inch-thick) that may be slid transversely as indicated by arrow 66 behind the transverse axis 29 of the balls 28 to be positioned vertically behind the balls 28 during use. A notch 68 may be formed in the upper edge 64 of the panel 67 between the ends to allow free passage of the strings 26 without interference. Binder clips 70 may be used to hold the graph paper 60 releasably to the panel 67 or replaceable and disposable panels 67 may be used having graph paper adhered thereto. The grid on the graph paper 60 can be used as a backdrop for photography or video for recording and measuring the trajectories of the balls 28

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. An apparatus for demonstrating conservation of momentum comprising:
    a support structure providing an elevated support for a first and second set of fixation points longitudinally spaced along separate horizontal, parallel rails, the parallel rails separated along a transverse axis;
    a set of strings having opposite ends each attached to a different one of corresponding first and second set of fixation points in transverse opposition and having lengths greater than a spacing of the parallel rows to hang therebelow;
    a set of balls having one of at least two different weights; and
    a set of connectors releasably attaching each of the balls to midpoints of corresponding different ones of the strings so that the balls hang adjacent to each other at equal height along a longitudinal row.

2. The apparatus of claim 1 wherein the connectors release with manual pressure on the ball downward away from the string.

3. The apparatus of claim 2 wherein the connectors include a magnet releasably attaching each given ball and string by magnetic attraction.

4. The apparatus of claim 3 wherein the connectors each comprise a magnet and a ferromagnetic portion, one attached to the string and one attached to the ball.

5. The apparatus of claim 4 wherein the magnet is supported by the string.

6. The apparatus of claim 3 wherein each string provides two separated fixation points to each connector, the fixation points spaced apart in the transverse direction to reduce twisting of the balls.

7. The apparatus of claim 6 wherein the two fixation points are defined by exit points of the string passing through a transverse bore through which the string may slide.

8. The apparatus of claim 1 wherein the balls have weights that differ by at least 10 percent.

9. The apparatus of claim 1 wherein the balls are all of equal size.

10. The apparatus of claim 1 wherein the balls are made of materials selected from at least two different materials from the group consisting of steel, aluminum, brass, and polymer.

11. The apparatus of claim 10 wherein the balls are selected from at least four different materials from the group consisting of steel, aluminum, brass, and polymer.

12. The apparatus of claim 1 wherein the balls include at least two balls having an identical weight and different size.

13. The apparatus of claim 1 wherein the balls include at least two balls having a same weight but constructed of different materials.

14. The apparatus of claim 1 wherein the balls include at least two sets of multiple balls of identical weights, the weights of the balls between the at least two sets being different.

15. The apparatus of claim 1 wherein the balls provide identical materials at points of contact with other balls but different weights.

16. The apparatus of claim 1 further including a panel extending vertically behind the balls as supported by a framework for recording balls swing information.

17. The apparatus of claim 16 wherein the panel includes a ruled grid.

18. An apparatus for demonstrating conservation of momentum comprising:
    a support structure providing an elevated support for a first and second set of fixation points longitudinally spaced along separate horizontal, parallel rows, the parallel rows separated along a transverse axis;
    a set of strings having opposite ends each attached to a different one of corresponding first and second sets of fixation points in transverse opposition and having lengths greater than a spacing of the parallel rows to hang therebelow;
    a first set of balls having an identical weight;
    a second set of balls having weights different from the first set of balls;
    a set of connectors adapted to releasably attach a subset of the first and second set of balls to midpoints of corresponding different ones of the strings so that the balls hang adjacent to each other at equal height along a longitudinal row.

19. The apparatus of claim 18 wherein the second set of balls includes balls of different weights.

* * * * *